Aug. 30, 1938.  M. DWORK  2,128,806

JACKING ATTACHMENT

Filed Oct. 17, 1936  2 Sheets-Sheet 1

Inventor

Max Dwork.

By Munn, Anderson & Liddy

Attorneys

Aug. 30, 1938.    M. DWORK    2,128,806
JACKING ATTACHMENT
Filed Oct. 17, 1936    2 Sheets—Sheet 2
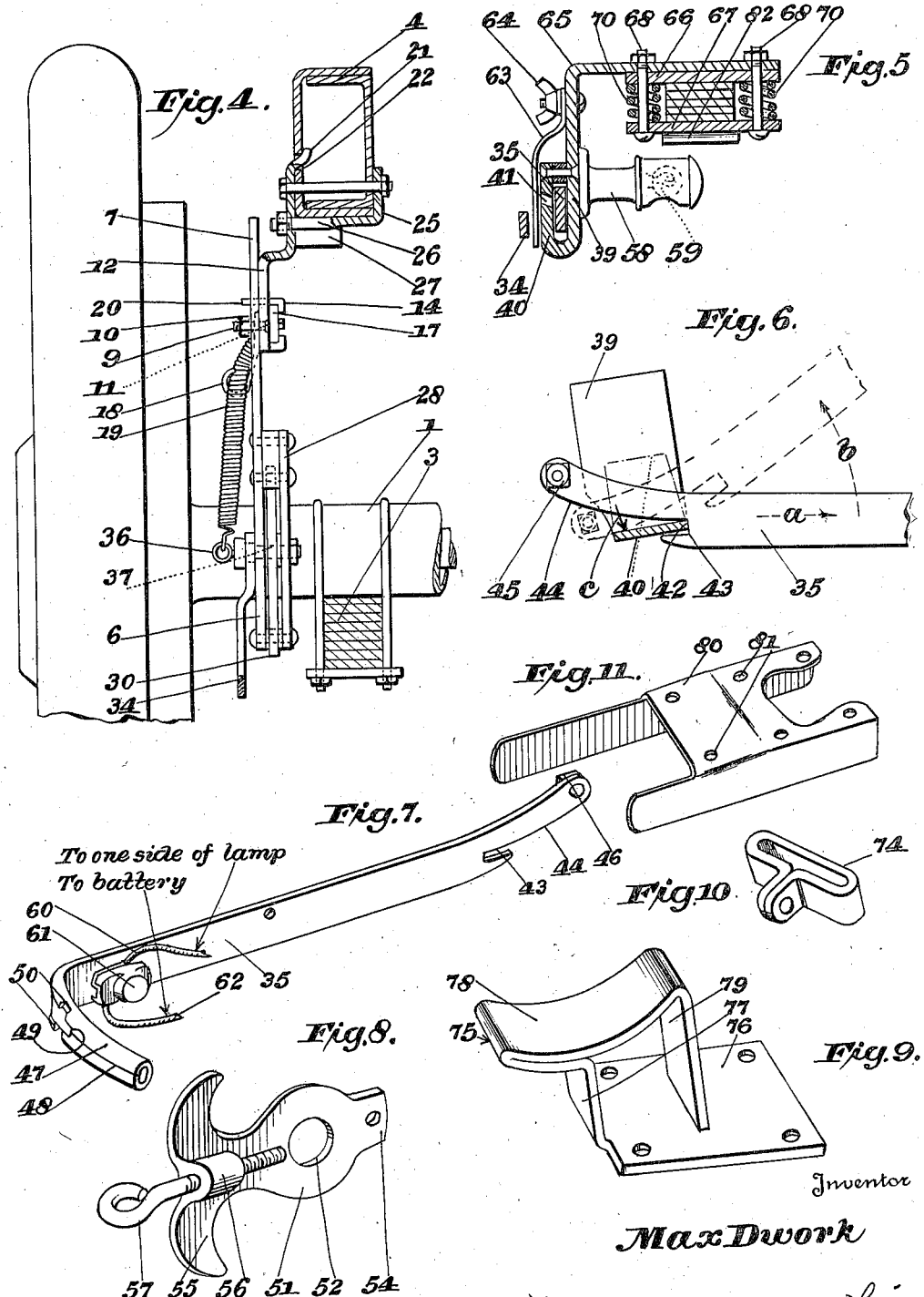
Inventor
Max Dwork
By Munn, Anderson & Liddy
Attorneys Patented Aug. 30, 1938

2,128,806

UNITED STATES PATENT OFFICE 2,128,806

JACKING ATTACHMENT

Max Dwork, Brooklyn, N. Y.

Application October 17, 1936, Serial No. 106,219

10 Claims. (Cl. 280—150)

This invention relates to improvements in jacking attachments in the class of land vehicles, attachments, and its objects are as follows:

First, to provide a jacking attachment for limiting the sag of the rear springs of a motor vehicle when elevating the chassis of the vehicle by placing a jack under one or the other of the rear springs preparatory to removing the tire.

Second, to provide a swingable hook with means for positively gripping the axle so as to insure against any possiblity of the axle dropping from the hook when the chassis is elevated on the respective side.

Third, to provide for such coaction between the detent arm and its combined guide and detent, that the arm can be worked with a lever motion to readily clear its notch from the detent upon releasing said arm, preparatory to catching the axle.

Fourth, to provide a steadying device for holding the foregoing arm, which is a part of a linkage that terminates at the hook, under spring tension so that there will be no rattling when the jacking device is not in use.

Other objects and advantages will appear in the following specification, reference being had to the accompanying drawings, in which:

Figure 4 is a cross section taken substantially on the line 4—4 of Fig. 1.

Figure 5 is a cross section taken substantially on the line 5—5 of Fig. 1.

Figure 6 is a detail diagrammatic view illustrating the lever action of the detent arm.

Figure 7 is a detail perspective view of the detent arm.

Figure 8 is a perspective view of a portion of the steadying device.

Figure 9 is a perspective view of a brace plate hereinafter referred to.

Figure 10 is a detail perspective view of a spring clip also referred to later on.

Figure 11 is a detail perspective view of a dust guard.

This invention is an improvement on an application for patent for jacking attachment filed by Max Dwork May 3, 1935, Serial No. 19,742, now Patent 2,061,025 of Nov. 17, 1936. The foremost purpose of the instant improvement, as well as of the invention in the copending application, is to limit the sag of the rear spring (herein referring to only one for convenience) when jacking up the chassis. The prevailing practice in automobile manufacture is to locate the chassis so low with respect to the ground that it is difficult to use an ordinary jack upon a tire becoming deflated. This has led to the practice of elevating the chassis by putting the jack under the rear spring near its outer end. Obviously, upon elevating the chassis the axle would maintain its relationship to the ground were it not for the instant provision of a hook to catch the axle and elevate it too.

Figure 1:
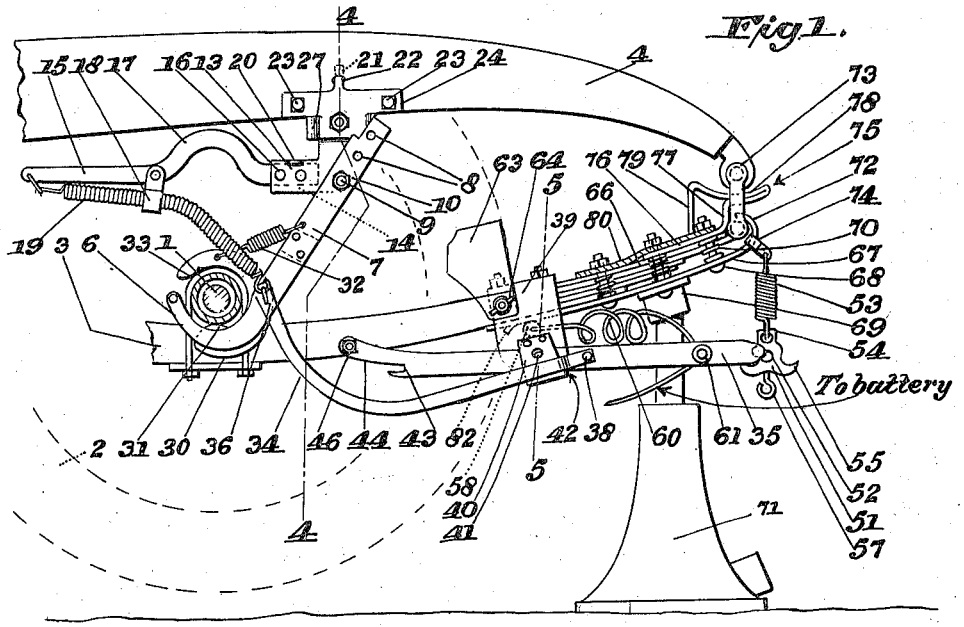
Figure 1 is a partially elevational and sectional view of the rear portion of the right side of a motor vehicle, showing the jacking attachment in use.

It is desired to first briefly describe certain elements that are common to the instant application and to Patent 2,061,025. The rear axle 1 carries the right rear wheel 2. The left rear wheel is omitted from the drawing, but the spring 3 is the left rear spring, and 4 designates a part of the left side of the chassis. The hook 6 will be identified because of its appearing in the patent, the shank 7 thereof having a series of holes 8, at a selected one of which the pivot bolt 9 is inserted (Figs. 1 and 4). A nut 10 is screwed on to the threaded end of the bolt. From this point on the structure varies from what is shown in the patent and is described as follows.

The bolt 9 preferably has a flat head 11 (Fig. 4) so as to enable its being countersunk in a bracket 12 which depends from the chassis 4. An angled extension 13 of this bracket has inturned flanges 14 which keep a forwardly extending stiff leg 15 from turning, especially when the rivets 16 are driven through. The stiff leg is arched at 17 (Fig. 1) to avoid conflict with the axle tubing when the spring 3 is unduly flexed. The stiff leg 15 carries a guide and retainer 18 for a spring 19 which is attached at one of its ends to the forward extremity of the stiff leg.

There is a stop lug 20 on the bracket 12. The latter has a single offset pin 21 which is inserted in a hole 22 in the chassis 4 (Fig. 4). The connection at this point is further stabilized by the bolts 23 that go through the wings 24 of the bracket and through the chassis, coming out on the inner side where nuts are screwed home against the flanged terminal 25 of a clamp bolt 26. The bracket is further stabilized by shoulders 27 that go under the chassis, as shown.

The arrangements as just described are particularly adapted to securing the bracket 12 to a tubular type of chassis shown in Fig. 4. If the connection of the bracket 12 were to be made to an open type of chassis, structure similar to that disclosed in the patent to Dwork, 2,003,502, of June 4, 1935, would be resorted to.

Figure 3:
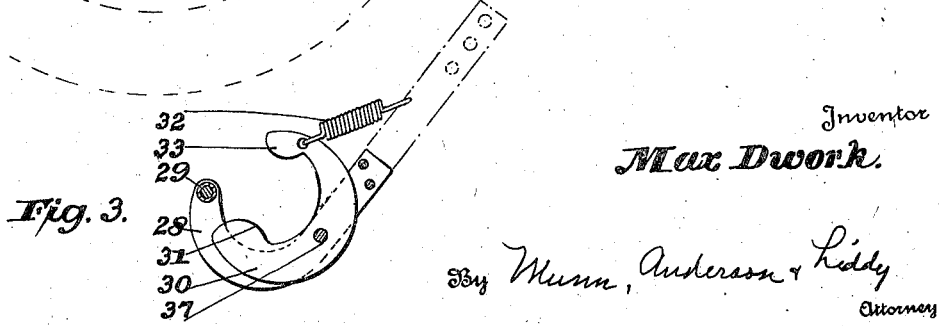
Figure 3 is a detail view of the swingable hook, showing the means by which the axle is positively gripped.

The hook 6 is now made double, the matching portion 28 (Fig. 3) being appropriately spaced from the main part of the hook, for instance by a washer 29 on one of the connecting rivets to provide a working place for the claw 30, which changes the identity of the hook into that of a clamp. This claw is substantially semi-circular in form, one of its ends being enlarged into a cam 31 that has the purpose of closing the claw upon the axle tubing when it engages the latter on the nether side, preparatory to completing the clamping action (Fig. 1). When the cam 31 first engages the axle tubing it causes the claw to turn counter-clockwise a slight distance, and this against the tension of a spring 32 which normally tends to raise the cam in respect to the hook (Fig. 3). The spring 32 is connected at its ends to the claw and to the shank 7 of the hook.

An enlargement 33 of the upper end of the claw makes a more nearly complete enclosure of the axle tubing (Fig. 1) and all together the clamp so nearly encircles the axle tubing as to insure the hook remaining in the axle-raising position when the parts are as shown in Fig. 1.

The hook 6 is manually actuated by what is herein collectively termed a linkage. This comprises a simple link 34 and a detent arm 35. The pivotal connection 36 between the forward end of the link 34 and the hook 6 also provides the anchorage for the other end of the previously mentioned spring 19. Further, the shank 37 of this connection goes through the double hook (Fig. 3) and provides the pivot for the claw 30. The rear end of the link 34 is pivoted to the arm 35, as at 38.

Figure 2:
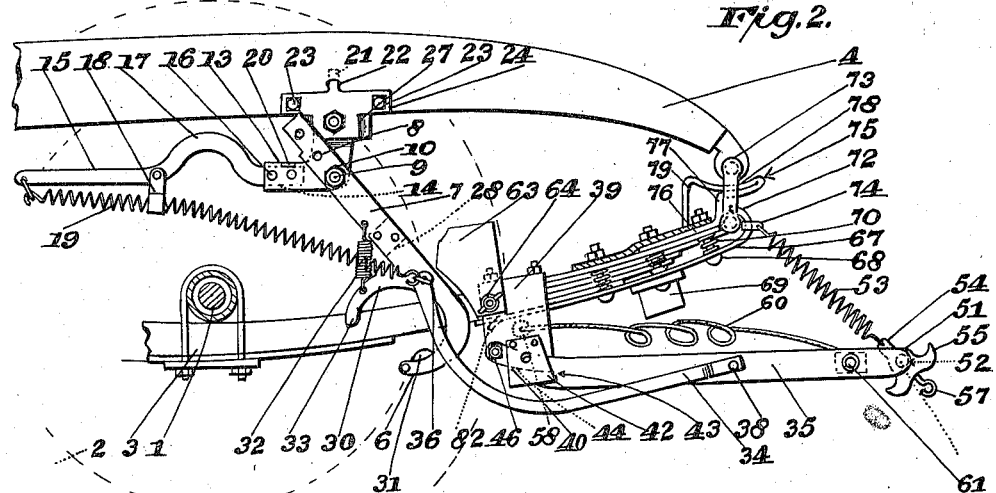
Figure 2 is a similar view showing the jacking attachment in its idle position.

A bracket 39 provides a guide for the detent arm 35, which is adapted to be slid back and forth. The guide passage is formed by the bent portion 40 which is riveted down as shown. A hole 41 enables lubricating the moving surfaces. The rear edge 42 (Fig. 6) provides a detent for the arm 35, the latter having a notch 43 to receive the detent and hold the arm in its rearwardly extended position, (Fig. 2). Said notch merges into the curvature 44 of the extension 45 of the arm. This curvature enables the arm 35 to partake of a lever action upon occasion. An appropriate stop 46 is attached to the forward extremity of the extension, preventing an inadvertent pulling out of the arm from its guide passageway.

The rear extremity of the arm is either converted into or is provided with a handle 47 (Fig. 7). By preference the arm 35 is bent upon itself until it forms a closed tube, as at 48, a portion 49 being cut out to provide a binding screw recess. There are notches 50 adjacent to the recess 49. A steadying device 51 (Fig. 8) is adapted to be slipped over the handle 47, for which purpose said device has a slightly oversized hole 52. When the device is slipped over the handle in the extended position of the latter (Fig. 2) the edges of the hole seat themselves in the notches 50, whereupon the device keeps the arm, in fact the entire linkage and the hook, from rattling, due to the tension of a fairly strong spring 53. One end of this spring is connected to the lug 54 of the device 51. The latter has finger-pieces 55 by which said device is conveniently pulled out against the tension of the spring, there being a central boss 56 in which the binding screw 57 is threaded. After the device is slipped over the handle, as stated, and is engaged with the notches 50, the screw 57 is driven home in the recess 49, making sure that the steadying device shall stay in place.

In order to aid the driver in changing tires at night, a lamp socket 58 (Fig. 5) is attached to the inner side of the guide bracket 39. This socket carries a lamp 59. One terminal of the lamp is grounded upon the metallic framework, the other being connected by means of a wire 60 (Fig. 1) to one side of any desired type of switch 61 (Fig. 7) which is attached to the arm 35 for convenience. The other side of the switch is connected by means of a wire 62 to the ungrounded terminal of the battery. When the occasion arises to use the jacking device, the driver will find it convenient to close the switch 61 and thus illuminate the immediate territory, enabling him to change tires to better advantage.

A dust guard is provided to prevent dust and other foreign matter readily getting into the guide passage of the arm 35. This merely comprises a plate 63 (Figs. 1 and 5). This is appropriately formed to fit down over the bent portion 40. The plate is shown raised in Figs. 1 and 2 to avoid concealing more important structure, but it is shown in its ultimate position in Fig. 5. A wing nut 64 on the pivot screw of the plate enables tightening the latter in any of its possible positions.

An angled extension 65 (Fig. 5) overlaps the top plate 66 of a pair of plates between which the rear spring 3 is clamped. The companion bottom clamp plate is designated 67. The lateral margins of these plates extend sufficiently far beyond the sides of the rear spring (Fig. 5) to enable the positioning of a series of bolts 68, which, when the nuts are tightened, clamp the plates together to provide a firm foundation for a jack socket 69. Heavy coil springs 70 are fitted upon the bolts 68 between the clamp plates 66, 67, so that said plates are held under tension despite the fact that they are tight. This tension avoids cramping the leaves of the spring 3 so that the former can slide a limited amount, as is customary. Upon desiring to elevate the chassis, the head of the jack 71 is inserted in the socket 69 and the jack is worked to raise the vehicle (Fig. 1).

The foregoing bottom plate 67 is curled at 72 to partly embrace the lower element of a U-shaped spring shackle 73. Said element is fitted in the knuckle of the top leaf of the spring 3 according to custom. The top plate 66 abuts this knuckle. A spring clip 74 (Fig. 10) is attached to the curled part 72, this clip providing a place of attachment for the other end of the spring 53.

A brace 75 transfers the lifting force of the jack from the spring 3 to the chassis 4, relieving the horizontal elements of the spring shackle of unnecessary and undesired strain. This brace comprises a plate 76 (Fig. 9) which is secured on top of the top plate 66 by some of the same bolts 68 which clamp the two plates together. An upstanding wall 77 of the plate 76 abuts the foregoing spring knuckle, and it is thus between the curled portion 72 and the wall 77 that the top and bottom plates 66, 67 are prevented from slipping forward and thus displacing the jack socket 69 from the preferred position.

A curved crotch 78, beginning at the wall 77 and ending in a supporting leg 79, fits under the knuckle of the chassis and makes contact there-with when the chassis is raised. Otherwise there is a slight space between the crotch and chassis knuckle to permit freedom of relative movement.

A dust guard 80 (Fig. 11) fits down over the top plate 66 mainly to keep dust and other foreign matter from the clamping bolts and springs 68, 70. This dust guard is only fractionally shown in Figs. 1 and 2 to avoid concealing the bolts and springs. It is perforated at 81 to fit upon the upper ends of the bolts, whereupon the nuts are screwed home against the dust guard to hold it in place.

The top and bottom plates 66, 67 constitute a mount for the guide bracket 39 on the top plate of which the angled extension 65 is superimposed as shown. Inasmuch as the mounting means is necessarily fairly heavy in order to perform the duties imposed on it, the bottom plate 67 is cut in on its forward edge and the midportion of the metal is bent down to form the lip 82 (Figs. 1, 2 and 5). This lip is curved so that there will be no sharp edge across which there might be danger of breaking the spring if the latter is unduly flexed at any time.

The operation is readily understood. The idle position of the jacking attachment is shown in Fig. 2. The structure shown here and elsewhere in the drawings is duplicated on the right side of the vehicle. The bracket 39, being firmly clamped to the rear spring 3, provides a firm foundation with which the detent arm 35 is interlocked to maintain the axle hook 6 in its retracted position. The detent edge 42 (Fig. 6) then occupies the notch 43 of the detent arm holding the linkage in the rearwardly extended position. The steadying device 51 is secured to the handle 47 to prevent rattling in the linkage.

Now in the event of the driver wishing to change tires he will release the binding screw 57 and slip the device 51 off of the handle 47. The first act is a slight rearward pull of the handle 35 (arrow a, Fig. 6). As soon as the detent edge 42 is cleared the handle is turned upwards (arrow b). The point at c where the curvature 44 then engages the bottom of the bent portion 40 becomes the fulcrum on which the arm is turned sufficiently to make the notch 43 clear the detent edge 42. The dotted line position (Fig. 6) shows this.

The driver has only to release the handle 47 when the spring 19, now under considerable tension, will pull the whole linkage forward, causing the cam 31 to strike the axle tubing and turn the claw 30 out of the way enabling the claw and the hook to substantially encircle the axle tubing (Fig. 1). The foregoing parts, previously called the clamp, now secure the hook to the axle tubing so that there can be no inadvertent slipping.

The purpose of the previously mentioned stop lug 20 (Fig. 1) is to prevent the hook shank 7 from being swung undesirably far to the rear when the arm 35 is pulled back and swung upward as stated in the initial operation. Before beginning the latter, if the time of operation happens to be at night, the driver will close the switch 61 and thereby light the lamp 59 so that the immediate territory will be illuminated.

It only remains to be said that when the hook 6 has served its purpose, namely to elevate the axle, when the chassis is jacked up, a rearward pull on the handle 47 will disengage the clamp. The handle must be pulled sufficiently far back to reengage the detent edge 42 (Fig. 6) with the notch 43, the stop 46 preventing the handle from being pulled too far. Obviously, steadying device 51 is restored to its original position.

I claim:—

1. In a jacking attachment which comprises a hook and means for pivotally mounting it on a chassis; linkage connected at one point with the hook for swinging the hook toward and from an axle, detent means incorporated in one part of the linkage, a combined guide and detent, the guide containing said part of the linkage for guidance when swinging the hook, and the detent of said guide engaging with the detent means of said part of the linkage to lock the linkage in one position, means by which said guide is attached to an adjacent spring, and a claw attached to the hook and cooperating with the hook to clamp an axle tubing when the detent means and detent are disengaged and said linkage is moved toward the axle tubing.

2. In a jacking attachment which comprises a hook and means for pivotally mounting it on a chassis; a stiff leg jutting out from the mounting means, a spring connected at its ends to the respective stiff leg and hook and tending to turn the hook on its pivot toward an axle tubing, detent means to hold the hook retracted, which detent means upon being released enables the spring to turn the hook toward the axle tubing, and a claw pivoted on the hook having a cam to engage the axle tubing and make the claw so turn that it, together with the hook, virtually encircle said tubing.

3. In a jacking attachment which comprises a double hook having a shank and means for pivotally mounting the shank on a chassis; said double hook providing a working space, a claw pivoted to the double hook in said space, said claw having a cam adapted to engage the nether part of an axle tubing, and a spring connected between the shank and the claw against the tension of which the claw is turned when said engagement occurs.

4. In a jacking attachment which comprises a hook and means for pivotally mounting it on a chassis; a stiff leg secured to the mounting means, a claw carried by and being complemental to the hook to provide an axle-tubing clamping device, a spring to draw the hook toward the axle tubing, one end of the spring being attached to the stiff leg, means which provides a combined pivot for the claw, and a place of attachment of the other end of the spring, linkage for actuating the hook against the tension of said spring, said linkage including a simple link, one end of which is also carried by said pivot means.

5. In a jacking attachment which comprises a hook and means for pivotally mounting it on a chassis; linkage for actuating the hook, said linkage including an arm which terminates at one end in a handle; guide means and means by which said guide means is attached to a vehicle spring, said guide means having a passage containing the arm for guidance when moving the arm to swing the hook, coacting detent means on the arm and guide means which are interlocked to hold the hook in a non-catching position beside an axle, and a steadying device having a connected spring which is anchored to a portion of said chassis, said steadying device being fitted over the handle to prevent the linkage and hook from rattling.

6. In a jacking attachment which comprises a hook and means for pivotally mounting it on a chassis; linkage for actuating the hook, said linkage including an arm terminating at one end in a handle which has at least one notch and a recess, guide means and means by which said guide means is attached to a vehicle spring, said guide means having a passage containing the arm for guidance when moving the arm to swing the hook, coacting detent means on the arm and guide means which are interlocked to hold the hook in a non-catching position beside an axle, and a steadying device having an attached spring anchored to said chassis, said device having a hole enabling slipping said device over the handle until it is caught in the notch and held by the spring tension, and a binding screw carried by the steadying device, then driven into the recess to lock the steadying device in place.

7. In a jacking attachment which comprises a hook and means for pivotally mounting it on a chassis; linkage for actuating the hook, said linkage including an arm, guide means which has a passage containing the arm for guidance when moving the arm to swing the hook, coacting detent means on the arm and guide means which are interlocked to hold the hook in a non-catching position beside an axle, an angled extension from the guide means extending across the spring of a vehicle, a mount on which said angled extension is superimposed, said mount consisting of top and bottom plates on the spring, means for both clamping the plates and said angled extension together, and means on both the top and bottom plates being closely stationed in respect to the knuckle of said spring so as to prevent the mount from slipping out of position.

8. In a jacking attachment which comprises a hook and means for pivotally mounted it on a chassis; linkage for actuating the hook, said linkage including an arm, guide means which has a passage containing the arm for guidance when moving the arm to swing the hook, coacting detent means on the arm and guide means which are interlocked to hold the hook in a non-catching position beside an axle, an angled extension from the guide means extending across the spring of a vehicle, and a mount on which said angled extension is superimposed, said mount consisting of a top plate having its end adjoining the knuckle of said spring, and a bottom plate having one end partly curled around the knuckle, said top plate having a brace plate superimposed thereon with an upstanding wall coacting with the curl and spring knuckle to prevent the mount from slipping back.

9. In a jacking attachment which comprises a hook and means for pivotally mounting it on a chassis; linkage for actuating the hook, said linkage including an arm, guide means which has a passage containing the arm for guidance when moving the arm to swing the hook, coacting detent means on the arm and guide means which are interlocked to hold the hook in a non-catching position beside an axle, an angled extension from the guide means extending across the spring of a vehicle, a mount on which said angled extension is superimposed, said mount consisting of a top plate having its end adjoining the knuckle of said spring, a bottom plate having one end partly curled around the knuckle, said top plate having a brace plate superimposed thereon with an upstanding wall coacting with the curl and spring knuckle to prevent the mount from slipping back, and a curved crotch in which the upstanding wall terminates, being in supporting relationship to a chassis knuckle.

10. In a jacking attachment which comprises a hook and means for pivotally mounting it on a chassis; linkage for actuating the hook, said linkage including an arm, guide means having a passage containing the arm for guidance when moving the arm to swing the hook, means by which to secure the guide means to the adjacent spring of a vehicle, said securing means including clamp plates on top and below the spring and bolts which go through said plates and said means to do the clamping, and a lip turned down from the bottom plate on a curve away from the spring to avoid breaking the spring in the event of an excessive downward flexure.

MAX DWORK.